United States Patent [19]

Fujita et al.

[11] Patent Number: 4,947,954
[45] Date of Patent: Aug. 14, 1990

[54] ACCELERATION-SLIPPAGE CONTROLLER FOR AN AUTOMOBILE

[75] Inventors: Kozo Fujita; Kiyotaka Ise, both of Susono, Japan

[73] Assignee: Toyota Jidosha Kabushiki Kaisha, Aichi, Japan

[21] Appl. No.: 309,156

[22] Filed: Feb. 13, 1989

[30] Foreign Application Priority Data

Feb. 19, 1988 [JP] Japan .................................. 63-37778

[51] Int. Cl.$^5$ .................... B60K 28/16; B60T 8/32; B60T 8/58
[52] U.S. Cl. .................................... 180/197; 303/103; 361/238; 364/426.02; 364/426.03
[58] Field of Search .................. 180/197, 233; 364/426.02, 426.03; 361/238; 303/95, 100, 130, 103

[56] References Cited

U.S. PATENT DOCUMENTS

| | | | |
|---|---|---|---|
| 3,825,799 | 7/1974 | Matsumura | 361/238 |
| 4,639,487 | 1/1987 | Nakamura et al. | 180/197 |
| 4,685,547 | 8/1987 | Ohashi et al. | 180/197 X |
| 4,721,176 | 1/1988 | Kabasin et al. | 180/197 |
| 4,722,411 | 2/1988 | Ohashi et al. | 180/197 |
| 4,736,814 | 4/1988 | Yogo et al. | 180/197 |
| 4,739,484 | 4/1988 | Fennel | 361/238 |
| 4,739,856 | 4/1988 | Inagaki et al. | 180/197 |
| 4,748,564 | 5/1988 | Matsuda | 364/426.02 |
| 4,788,644 | 11/1988 | Inagaki | 180/197 X |
| 4,811,808 | 3/1989 | Matsumoto et al. | 180/197 |
| 4,843,552 | 6/1989 | Inagaki | 180/197 X |

FOREIGN PATENT DOCUMENTS

| | | |
|---|---|---|
| 3206694 | 9/1983 | Fed. Rep. of Germany ...... 180/197 |
| 60-128057 | 7/1985 | Japan . |
| 61-1543 | 1/1986 | Japan . |
| 61-85248 | 4/1986 | Japan . |
| 61-283736 | 12/1986 | Japan . |
| 62-67257 | 3/1987 | Japan . |
| 62-149545 | 7/1987 | Japan . |

Primary Examiner—Mitchell J. Hill
Attorney, Agent, or Firm—Oliff & Berridge

[57] ABSTRACT

An acceleration-slippage controller having an instantaneous-slippage detector for maintaining a good acceleration of an automobile. After an acceleration-slippage control has started due to slippage detected at a driven wheel, the instantaneous-slippage detector determines whether the detected slippage is instantaneous. If the slippage is determined to be instantaneous, the acceleration-slippage control is immediately interrupted so that a long acceleration-slippage control cycle does not limit the acceleration of the automobile.

8 Claims, 12 Drawing Sheets

FIG. 8A

| THROTTLE OPENING θ[%] | ENGINE SPEED NE (×100rpm) | | | | | |
|---|---|---|---|---|---|---|
| | 0 | 4 | 8 | 12 | 16 | --- |
| 0 | 1 | 1 | 1.2 | 1.4 | 1.6 | --- |
| 5 | 1.4 | 1.4 | 1.3 | 1.3 | 1.4 | --- |
| 10 | 2 | 2.1 | 2.2 | 2 | 1.8 | --- |
| 15 | 4 | 4 | 4 | 2.8 | 3 | --- |
| 20 | 4 | 4 | 4 | 4 | 3.5 | --- |
| 25 | 4 | 4.5 | 5 | --- | --- | --- |
| --- | --- | --- | --- | --- | --- | --- |

MAIN-THROTTLE VALVE OPENING $\theta_M$

SUB-THROTTLE VALVE OPENING $\theta_S$

BRAKE PRESSURE $P_B$

INDICATOR

SPEED

WHEEL ACCELERATION

WHEEL SPEED

THROTTLE OPENING

ACCELERATION-SLIPPAGE CONTROLLER FOR AN AUTOMOBILE

BACKGROUND OF THE INVENTION

This invention relates to an acceleration-slippage controller for controlling acceleration slippage that occurs between a driven wheel and a road surface during acceleration of an automobile.

Prior to this invention, various acceleration-slippage controllers have been introduced. One of them is disclosed in Japanese Published Unexamined Patent Application No. S61-1543, in which, when acceleration slippage of a driven wheel is detected based on a revolution speed of the driven wheel, a driving torque of the driven wheel is controlled until the slippage disappears.

The acceleration-slippage controller of this type maximizes a frictional force between the driven wheel and a road surface during acceleration of an automobile and produces a greater acceleration of the automobile. When a change rate of the revolution speed of the driven wheel exceeds a preset value, or when the revolution speed of the driven wheel exceeds a reference speed determined based on a body speed, it is determined that slippage has occurred.

This determination of slippage occurrence has a problem. If the driver kicks down the acceleration pedal and the automobile accelerates very sharply on the dry road, the revolution speed of the driven wheel greatly increases in a short time. In this case, because the change rate of the driven-wheel speed is very high, the slippage is erroneously detected, resulting in the unnecessary execution of an acceleration-slippage control. This hinders the desired acceleration of the automobile.

The erroneous slippage determination is caused not only by the quick acceleration but by mechanical play in the transmission system. The revolution speed sensor for the driven wheel is normally placed on the output shaft of the transmission. Therefore, when the engine accelerates, the output shaft quickly responds, which makes the slippage determination due to a play of the transmission system. But the driven wheels do not actually accelerate.

SUMMARY OF THE INVENTION

An object of the invention is to maintain a good acceleration of an automobile by interrupting an acceleration-slippage control when the acceleration-slippage control starts due to instantaneous slippage.

This and other objects are achieved by the present invention as set forth below. According to the invention, a control system for an acceleration slippage of an automobile comprises: the driven-wheel speed sensor M1 for sensing a speed of a driven wheel of the automobile; the body speed sensor M2 for sensing a body speed of the automobile; the slippage detection means M3 for detecting slippage of the driven wheel having a slippage rate greater than a preset value using the driven-wheel speed and the body speed; the slippage controller M4 for starting an acceleration-slippage control according to a starting condition that regards the slippage rate, and for terminating the acceleration-slippage control according to a normal terminating condition that is indirectly connected to the slippage rate; the instantaneous-slippage detector M5 for determining whether the detected slippage is instantaneous; and the interrupting means M6 for terminating the acceleration-slippage control when the detected slippage is determined to be instantaneous.

BRIEF DESCRIPTION OF THE DRAWINGS

The invention may be best understood by referring to the following description of the preferred embodiment and the drawings in which:

FIG. 8A shows a part of a table for determining a correction factor K to calculate the sub-throttle valve control amount;

DETAILED DESCRIPTION OF A PREFERRED EMBODIMENT

Figure 1:
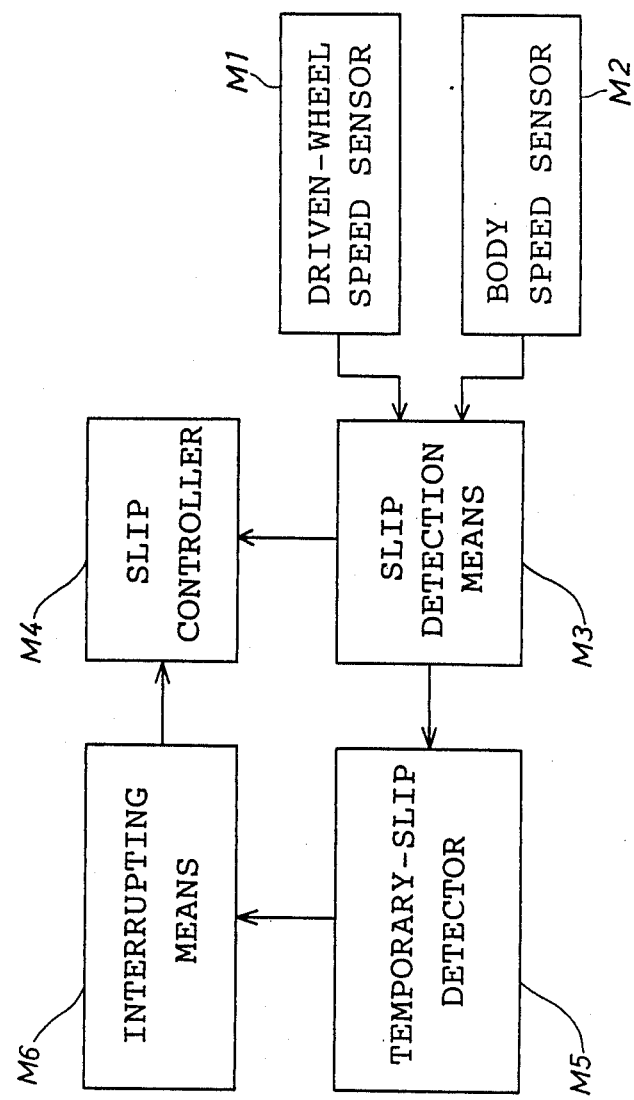
FIG. 1 is a block diagram showing a basic structure of the invention.

Now, one embodiment of the present invention will be described referring to the drawings. The embodiment is a rear-wheel driven automobile equipped wi&h the acceleration-slippage control system of the invention. When acceleration slippage occurs, both an engine output control for adjusting intake air and a brake control for adjusting a brake force of a driven wheel are executed as an acceleration-slippage control.

Figure 2:
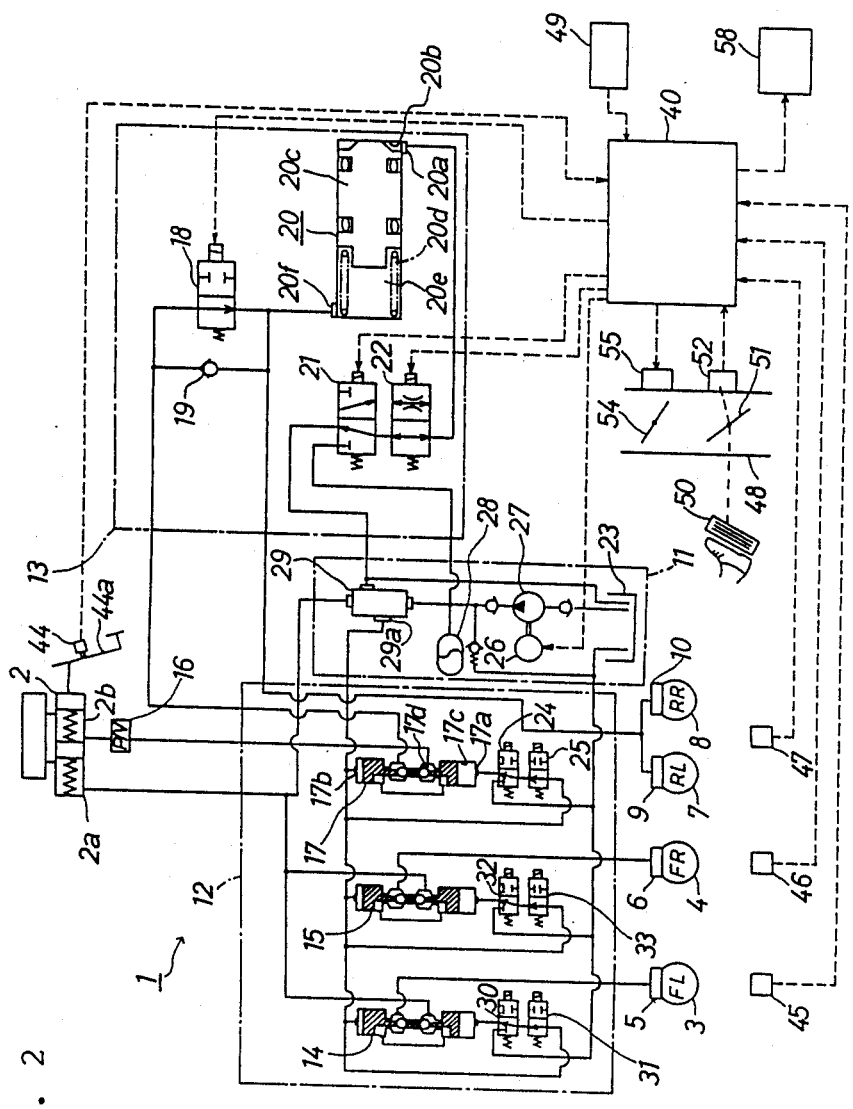
FIG. 2 is a circuit diagram of the oil pressure circuit and its control system of an embodiment of the invention.

As in FIG. 2, the acceleration-slippage control system 1 includes: a brake master cylinder 2; left and right front non-driven wheels 3 and 4 and their wheel cylinders 5 and 6; left and right rear driven wheels 7 and 8 with their wheel cylinders 9 and 10; an oil pressure source 11; an oil circuit 12 for anti-skid control; and another oil circuit 13 for the acceleration-slippage control. The oil pressure source 11 and the oil circuits 12 and 13 are provided between the brake master cylinder 2 and the wheel cylinders 5, 6, 9 and 10.

Between a first chamber 2a of the brake master cylinder 2 and the front wheel cylinders 5 and 6 are, respectively, left and right front volume-control valves 14 and 15 for the anti-skid control. Between a second chamber 2b of the brake master cylinder 2 and the rear wheel cylinders 9 and 10 are: a proportional valve 16; a rear volume-control valve 17 for the anti-skid control; a first solenoid valve 18 and a check valve 19 which are placed in parallel; and a volume-control valve 20 for the acceleration-slippage control.

When the anti-skid control is executed, the first solenoid valve 18 is not energized but rests at the position shown in FIG. 2, allowing communication between the volume-control valve 17 and the volume-control valve 20. A second solenoid valve 21 and a third solenoid valve 22, sequentially connected to a control input port 20a of the volume-control valve 20, are not energized but rest at the position shown in FIG. 2, allowing communication between a pressure-control chamber 20b of the volume-control valve 20 and a reservoir 23 of the oil pressure source 11. Therefore, a piston 20c of the volume-control valve 20 is biased bY a spring 20d into the position as shown in FIG. 2. At this time, the volume-control valve 17 moves into one of three states according to the energized or de-energized states of sequentially provided first rear change valve 24 and second rear change valve 25, as follows:

(A1) An output port 29a of a regulator 29 and the first control input port 17a communicate. Here, the regulator 29 modulates the oil pressure from an oil pump 27 or from an accumulator 28 of the oil pressure source 11 according to the brake pedal displacement. The oil pump 27 is driven by an oil-pump motor 26.

(A2) the first input port 17a, the regulator 29 and the reservoir 23 are disconnected from one another.

(A3) The first input port 17a and the reservoir 23 communicate.

On the other hand, a second control input port 17b of the volume-control valve 17 always communicates with the output port 29a of the regulator 29. Therefore, the volume-control valve 17 responds to the above three states as follows. The oil pressure within a first oil chamber 17c having the first input port 17a is: (A1) increased, (A2) maintained, or (A3) decreased according to the three states of the volume-control valve 17 described above. A volume of a brake-pressure chamber 17b changes according to the pressure in the first oil chamber 17c. Through this mechanism, the volume-control valve 17: (A1) increases, (A2) maintains, or (A3) decreases the pressure in the left and right rear wheel cylinders 9 and 19 via the first solenoid valve 18 and the check valve. 19. Similarly, the volume-control valves 14 and 15 work against the left and right front wheel cylinders 5 and 6 according to the energized or de-energized states of left front firs& and second change valves 30 and 31 and right front first and second change valves 32 and 33. The first and second change valves 24, 25, 30, 31, 32 and 33 are energized or de-energized by an anti-skid control circuit (not shown).

When the acceleration-slippage control is executed, the first solenoid valve 18 is energized to move into a right side position, which blocks the oil path. This cuts the communication between the rear anti-skid volume-control valve 17 and the acceleration slippage volume-control valve 20. At this time, the volume-control valve 20 moves into one of the following four states, according to the energized or deenergized states of the second and third solenoid valves 21 and 22, which are sequentially connected to the control input port 20a.

(B1) The accumulator 28 and the control input port 20a communicate.

(B2) The accumulator 28 and the control input port 20a communicate via a throttle valve.

(B3) The reservoir 23 and the control input port 20a communicate via a throttle valve.

(B4) The reservoir 23 and the control input port 20a communicate.

The volume-control valve 20 responds to the above four states as follows. The pressure in a pressure-control chamber 20b having the control input port 20a: (B1) quickly increases, (B2) slowly increases, (B3) slowly decreases, or (B4) quickly decreases according to the above four states of the volume-control valve 20. This pressure change changes the volume of the pressure-control chamber 20b and moves the piston 20c to the right or left against the force of the spring 20d. With this movement of the piston 20c, pressure oil is supplied from an output port 20f of the chamber 20e to the left and right rear wheel cylinders 9 and 10, making the pressure within the wheel cylinders 9 and 10: (B1) quickly increase, (B2) slowly increase, (B3) slowly decrease, or (B4) quickly decrease according to the above four states of the volume-control valve 20.

Acceleration slippage is controlled by a control circuit 40. The acceleration-slippage control circuit 40 receives signals from: a pedal switch 44 for sending an ON signal when a brake pedal 44a is pressed; a left front wheel speed sensor 45, a right front wheel speed sensor 46 and a rear wheel speed sensor 47 for sensing the revolution speed of the left front wheel 3, the right front wheel 4 and the rear wheels 7 and 8, respectively; an engine speed sensor 49 for sensing the revolution speed of the engine; and a throttle position sensor 52 for sensing an opening of a main-throttle valve 51 in an intake path 48 of the engine according to the status of an accelerator pedal 50. The control circuit 40 detects an acceleration-slippage rate of the rear wheels based on the input signals and controls the rear-wheel brake system by operating the first, second and third solenoid valves 18, 21 and 22 and the oil-pump motor 26, and controls a rear-wheel brake system. The rear wheel speed sensor 47 is located on the transmission output shaft between the engine and the left and right rear wheels 7 and 8, and detects an average speed of the left and right wheels.

The control circuit 40 connects to a sub-throttle motor 55, which drives a sub-throttle valve 54, to adjust an output torque of the engine when the slippage occurs.

Figure 3:
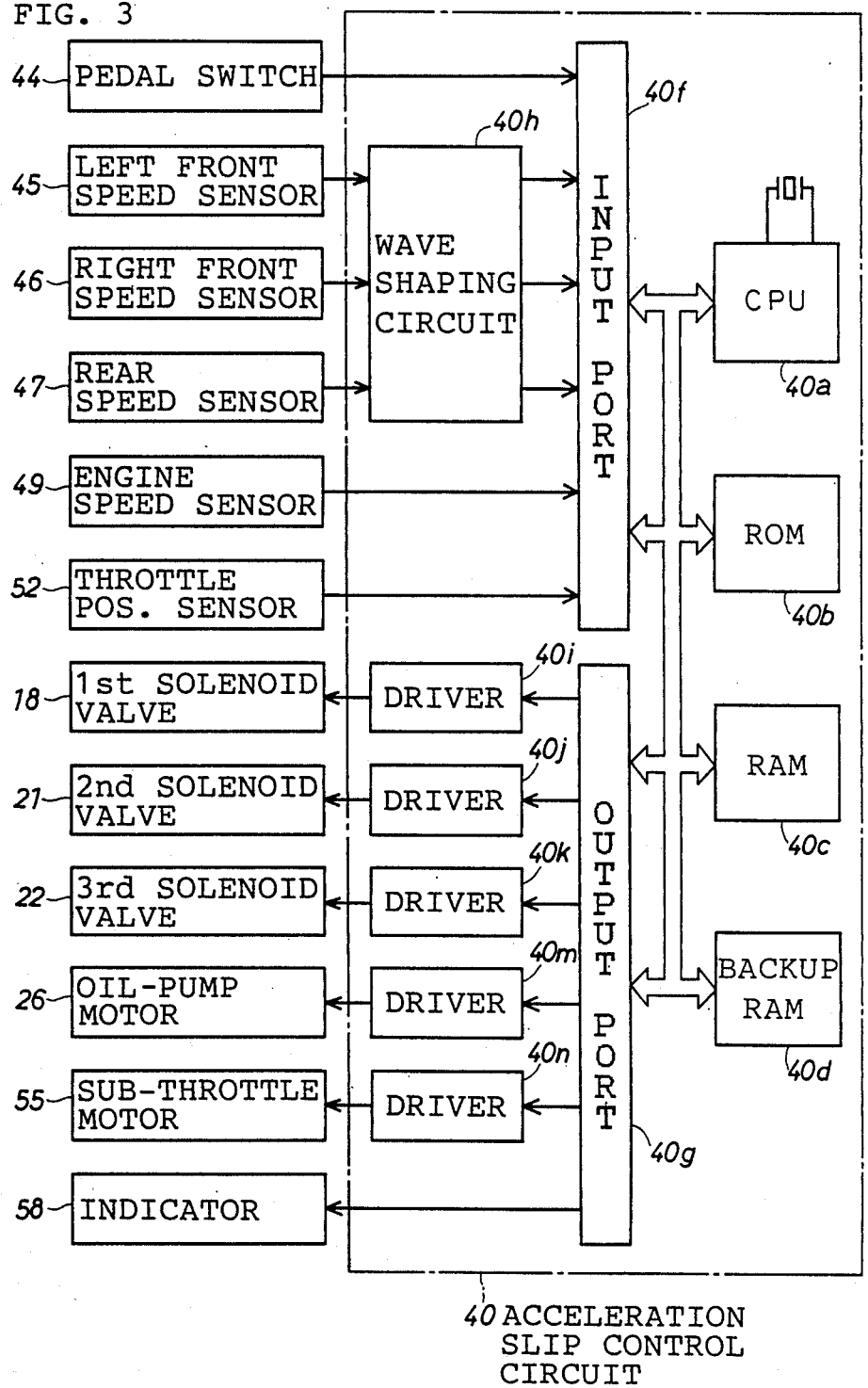
FIG. 3 is an electrical block diagram of the acceleration-slippage control circuit of the embodiment.

The structure of the control circuit 40 is here explained with reference to FIG. 3. The control circuit 40 is a microcomputer including: a CPU 40a, a ROM 40b, a RAM 40c, a backup RAM 40d, input and output ports 40f and 40g, respectively, a wave shaping circuit 40h, and driver circuits 40i, 40j, 40k 40m and 40n for solenoid valves and motors. The pedal switch 44, the engine speed sensor 49 and the throttle position sensor 52 are directly connected to the input port 40f and the speed sensors 45, 46 and 47 are connected via the wave shaping circuit 40h to the input port 40f. The CPU 40a receives signals from these switches and sensors via the input port 40f. The first, second and third solenoid valves 18, 21 and 22, oil-pump motor 26 and the sub-throttle motor 55 are connected via the driver circuits 40i, 40j, 40k, 40m and 40n to the output port 40g. The CPU 40a sends signals to these valves and motors via the output port 40g. The output port 40g also connects to an acceleration-slippage control indicator 58 in a cabin. The indicator 58 is switched on by a warning routine described later to inform the driver of the execution of the acceleration-slippage control while the slippage control is under way.

The processes executed in the control circuit 40 are hereinafter explained with reference to the flow charts of FIGS. 4A, 4B, 5, 6 and 7. In this embodiment, the sub-throttle valve 54 is started when acceleration slippage is detected. If the slippage of the driven wheel further increases, the brake control is simultaneously used.

The control-amount calculation routine and the control routine for the sub-throttle valve 54, both of which are repeatedly executed at preset intervals, are set forth below with reference to the flow charts of FIGS. 4A and 4B.

Figure 4A:
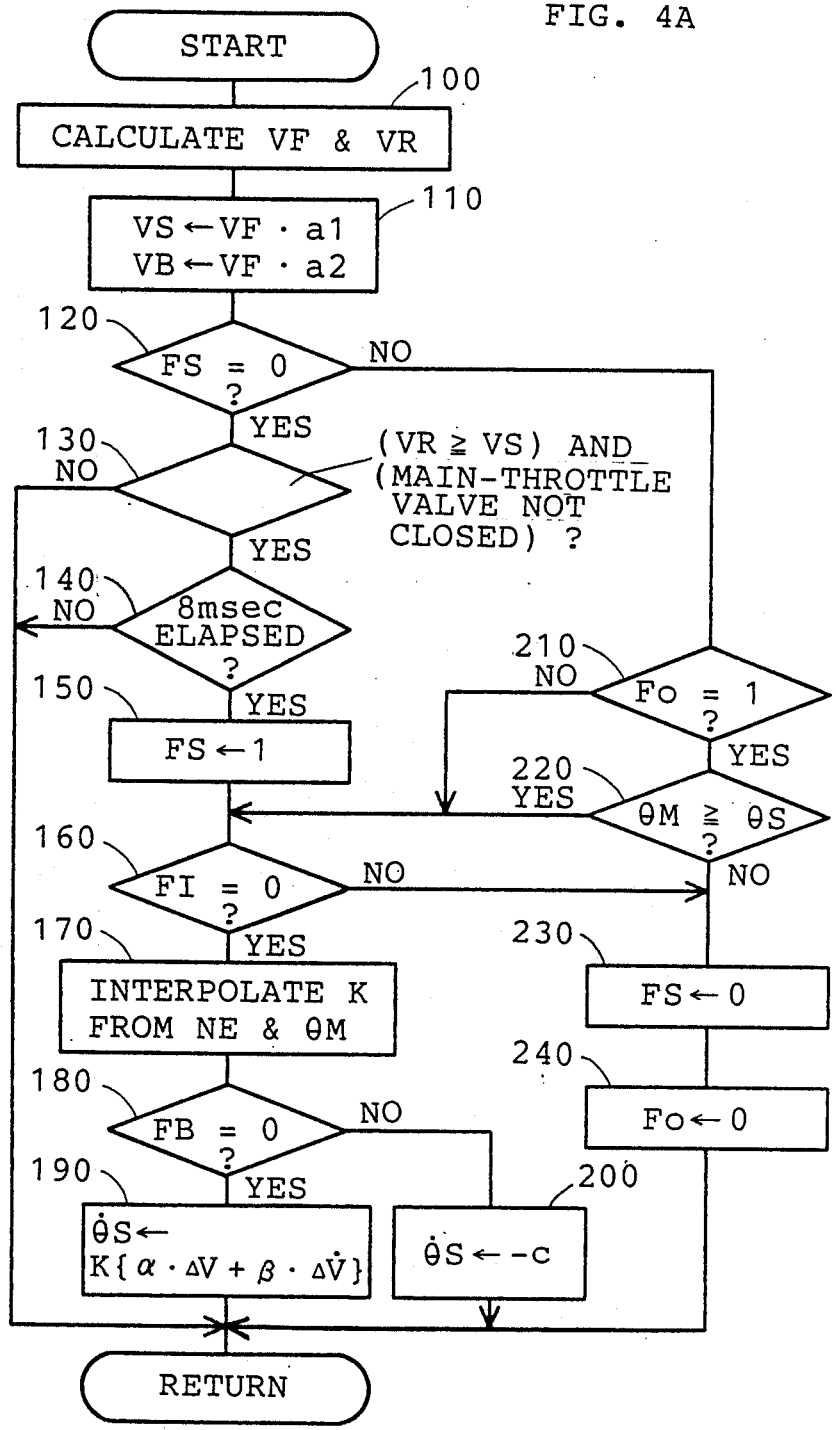
FIG. 4A is a flow chart for calculating a control amount of the sub-throttle valve.

When the routine of FIG. 4A starts, the step 100 calculates a body speed VF and a driven-wheel speed VR based on the signals from the respective sensors 45, 46, and 47. The body speed VF is calculated by multiplying an average output value of the speed sensors 45 and 46, or the greater of the two outputs, by the peripheral length of the front wheel. The driven-wheel speed VR is calculated by multiplying an output value of the speed sensor 47 by the peripheral length of the rear wheel.

From the calculated body speed VF, step 110 calculates a reference speed VS for starting the sub-throttle valve control and another reference speed V( for starting the brake control, as follows:

$$VS = VF \cdot a1 \quad (1)$$

$$VB = VF \cdot a2 \quad (2)$$

where both a1 and a2 are coefficients greater than one such that a1 < a2. Since VS is a target speed of the driven wheel in the acceleration-slippage control, the value a1 is selected such that the driving force (or traction force) of the driven wheel on the road is at its maximum. For example, the value a1 is set between 1.12 to 1.20. Instead of the above formulae (1) and (2), the following equations may be used to determine the reference values VS and VB.

$$VS = VF + b1 \quad (3)$$

$$VB = VF + b2 \quad (4)$$

where 0 < b1 < b2.

Step 120 determines whether a flag FS is reset to 0, i.e., whether the sub-throttle valve 54 is not currently controlled. The flag FS indicates the execution of the sub-throttle valve control and is set when the sub-throttle valve control starts. If FS=0, step 130 determines whether the main-throttle valve 51 is not completely closed and the driven-wheel speed VR exceeds the reference speed VS. If this condition is not satisfied, the routine ends.

If this condition exists, step 140 determines whether a second preset time period (e.g., 8 msec) has elapsed. If the answer is NO, the routine ends. This prevents unnecessarily starting the sub-throttle valve control for a very short-time revolution change of the driven wheels 7 and 8 due to irregular road surface. When the preset period has elapsed, step 150 sets the flag FS.

Step 160 determines whether a flag FI is reset to 0. The flag FI is set when the slippage at the driven wheel is determined to be instantaneous in the instantaneous-slippage detection routine described later. Therefore, step 160 determines whether the determination of the slippage start judgement at step 130 is erroneous, or the slippage is unnecessary to control. If FI=0, step 170 calculates a correction factor K from the table stored in the ROM 40b, as shown in FIG. 8A, based on the engine speed NE and a throttle opening θ.

Figure 8B:
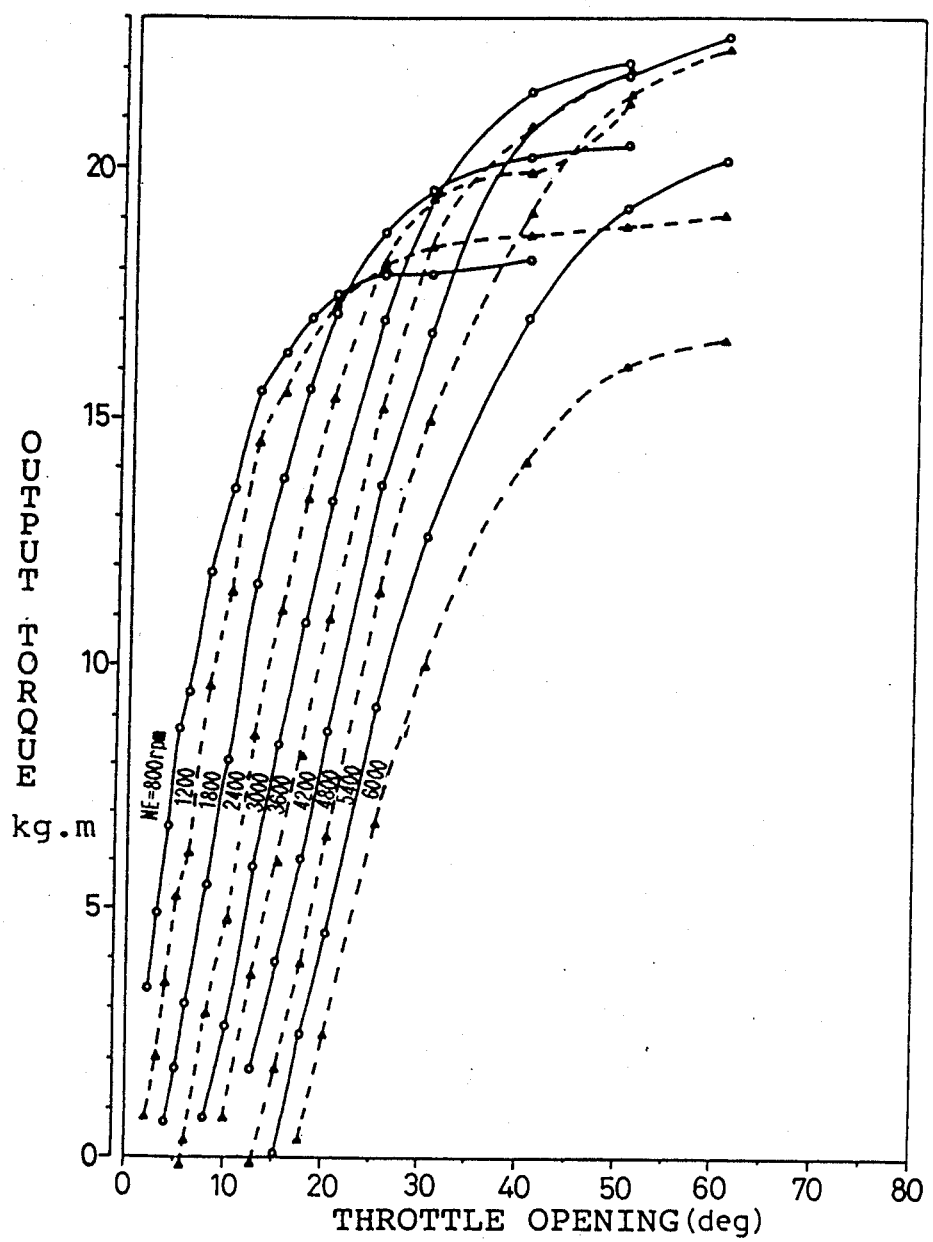
FIG. 8B is a graph showing the relationship between the throttle valve opening and the engine output torque.

This correction factor K is introduced to compensate for the nonlinear relationship between the throttle opening θ and the engine output torque as shown in FIG. 8B. In other words, it is introduced to prevent an unnecessarily excessive opening of the sub-throttle valve 54 which causes deteriorated responsiveness of the sub-throttle valve 54, because, as seen in FIG. 8B, the output torque briskly responds to a narrow-opening of a throttle valve but hardly responds to an intermediate or wide opening of the valve.

On calculating the correction factor K, if the main-throttle valve opening θM is less than the sub-throttle valve opening θS, the opening θM of the main-throttle valve 51 is used as a throttle opening θ. If, after starting of the slippage control, the sub-throttle opening θS becomes less than the main-throttle opening θM, the sub-throttle opening θS determined based on the control amount of the sub-throttle valve 54 is used as a throttle opening θ.

Step 180 determines whether a flag FB is reset to 0, i.e., whether the brake system is not currently controlled. The flag FB indicates the execution of the brake control and is set when the brake control starts. If FB=0, step 190 calculates a control amount θ̇S of the sub-throttle valve 54 according to the following equation.

$$\dot{\theta}S = K\{\alpha \cdot \Delta V + \beta \cdot \Delta \dot{V}\} \quad (5)$$

If the flag FB is set, i.e., the brake control is executed, step 200 sets the control amount θ̇S of the sub-throttle valve 54 at a negative preset constant −c. This control amount θ̇S is a time derivative of the sub-throttle opening θS, i.e., a target speed of the motor 55. In the equation (5), α is a proportional gain; β is a differential gain; ΔV is a difference (VS−VR) between the reference driven-wheel speed VS and the driven-wheel speed VR; and ΔV̇ is its time derivative. Thus, when the brake control is not executed, the sub-throttle valve 54 is controlled so that the driven-wheel speed VR quickly approaches the reference speed VS.

The sub-throttle valve 54 is closed at a constant speed c during the brake control. This is because the driven-wheel speed VR, especially its differential value V̇R, responds very briskly to the brake control: if the control amount θ̇S is determined according to the equation (5) using the difference ΔV(=VS−VR) and its differential value ΔV̇, a hunting of the sub-throttle opening might occur during the brake control. The constant speed c for the sub-throttle valve 54 can prevent the brake control and the sub-throttle opening control from disturbing each other.

When step 120 determines that the flag FS is set, i.e., that the sub-throttle valve 54 is under control, step 210 determines whether a flag Fo is set to 1. The flag Fo is set at 1 when the sub-throttle opening θS is less than the main-throttle opening θM after the starting of the sub-throttle valve control shown in FIG. 4B. If the answer is NO, the program proceeds to step 160. If the answer is YES, step 220 determines whether the sub-throttle opening θS is greater than the main-throttle opening θM. If θM ≦ θS, the program proceeds to step 160. But if θM < θS, it is assumed that the slippage would no longer occur at the driven wheel no longer, and steps 230 and 240 reset the flags FS and Fo, respectively, and then the routine ends.

When step 160 determines that the flag FI is set i.e., that step 130 has erroneously detected the slippage, steps 230 and 240 reset the flags FS and Fo, respectively and then the routine ends. The sub-throttle opening $\theta S$ is calculated based on the control amount of the sub-throttle valve 54 in the sub-throttle valve control routine.

Figure 4B:
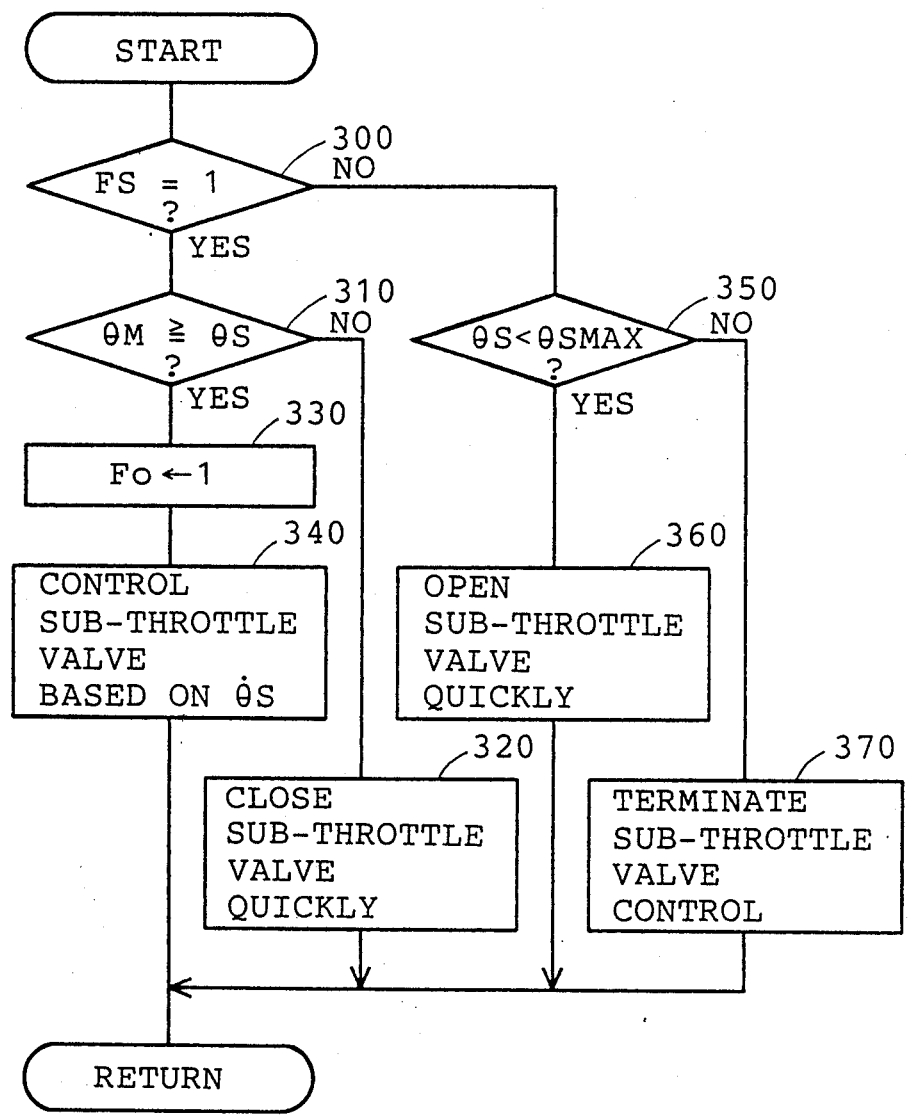
FIG. 4B is a flow chart for a sub-throttle valve control in the acceleration-slippage control of the embodiment.

The sub-throttle valve control routine shown in FIG. 4B is then explained.

Step 300 determines whether the flag FS is currently set. If the answer is YES, step 310 determines whether the sub-throttle opening $\theta S$ is less than the main-throttle opening $\theta M$. If $\theta M < \theta S$, step 320 drives the motor 55 to close the sub-throttle valve 54 quickly, and then the routine ends. On the other hand, if $\theta M \geq \theta S$, step 330 sets the flag Fo. Step 340 drives the motor 55 to move the sub-throttle valve 54 based on the calculated control amount (speed) $\theta S$, and then the routine ends.

When step 300 determines that the flag FS is reset, step 350 determines whether the sub-throttle valve 54 is fully open, i.e., whether the sub-throttle opening $\theta S$ is less than the maximum value $\theta SMAX$. If $\theta S < \theta SMAX$, step 360 drives the motor 55 to open the sub-throttle valve 54 quickly, and then the routine ends. If the sub-throttle valve 54 is fully open, step 370 stops the motor 55 and terminates the sub-throttle valve control. Then the routine ends.

In this embodiment, on detecting the slippage of the driven wheel from the driven-wheel speed VR and the reference speed VS, the sub-throttle valve control starts. Then, when the sub-throttle opening $\theta S$ controlled according to the difference (VS−VR) exceeds the main-throttle opening $\theta M$, the sub-throttle valve control ends under the assumption that the acceleration-slippage control is unnecessary any more. Further, after the starting of the sub-throttle valve control, if step 160 determines that the flag FI is set, the flag FS is reset to immediately stop the acceleration-slippage control at steps 350, 360 and 370.

Figure 5:
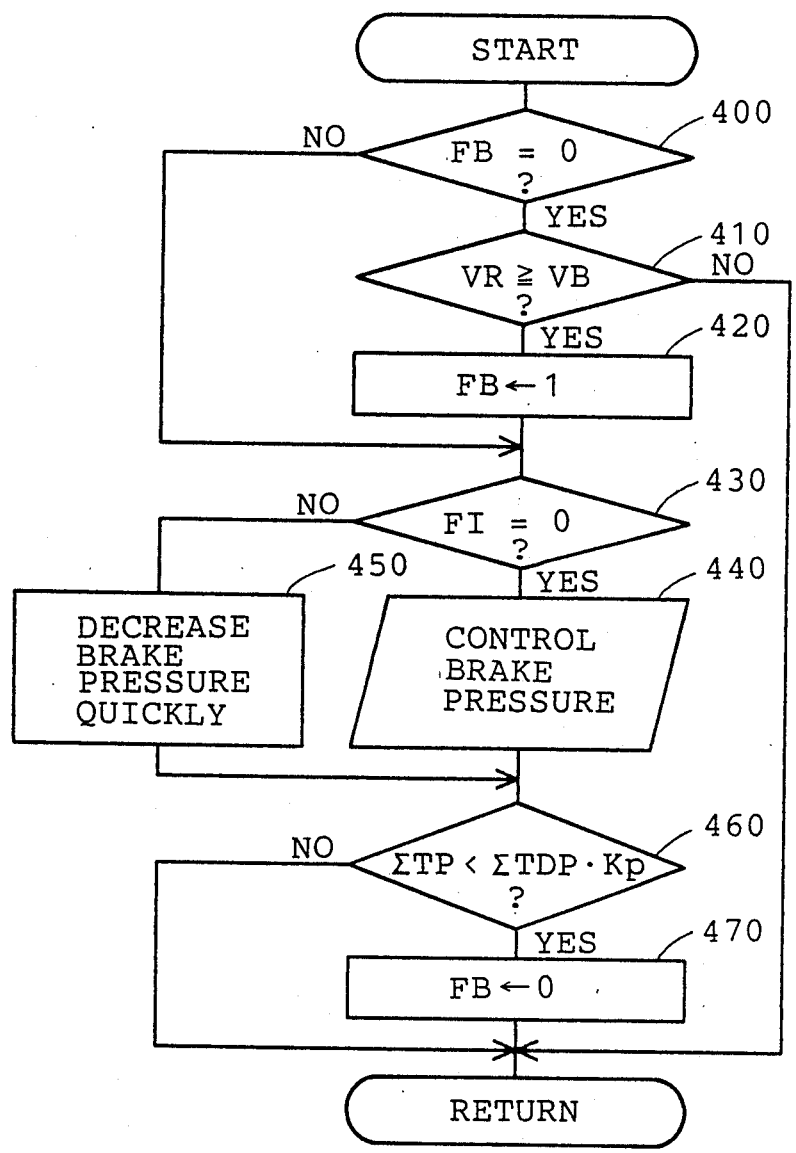
FIG. 5 is a flow chart for a brake pressure control in the acceleration-slippage control of the embodiment.

The brake control routine by the control circuit 40, which is repeatedly executed at preset intervals, is described below with reference to the flow chart of FIG. 5.

When the routine starts, step 400 determines whether the flag FB is reset to 0, i.e., whether the brake system is not currently controlled. If FB=0, step 410 determines whether the conditions for the brake control exist, i.e., whether the driven-wheel speed VR exceeds the higher reference value VB. If the answer is NO, the routine ends. However, if the answer is YES, step 420 sets the flag FB. Step 430, similarly as step 160 of FIG. 4A, determines whether the flag FI is reset, i.e., whether step 410 has erroneously, or unnecessarily, detected such slippage. If FI=0, the step 440 executes the brake control according to the following Table 1.

TABLE 1

| speed | acceleration | | |
|---|---|---|---|
| | $V < G2$ | $G2 \leq V < G1$ | $V \geq G1$ |
| $VR \geq VB$ | SD | SU | FU |
| $VS \leq VR < VB$ | FD | SD | SD |
| $VR < VS$ | FD | FD | FD |

In the table, $\dot{V}$ is a driven-wheel acceleration, G1 is a positive reference acceleration, G2 is a negative reference acceleration, and FU, SU, FD and SD respectively represent quick increase, slow increase, quick decrease and slow decrease in the oil pressure in driven-wheel brake cylinders 9 and 10.

Specially, step 440 calculates the driven-wheel acceleration $\dot{V}$ based on the driven-wheel speed VR, and then increases the oil pressure if the driven-wheel speed VR exceeds VB and the driven-wheel acceleration $\dot{V}$ exceeds G2. Otherwise, step 440 decreases the oil pressure. Thus, the revolution speed of the driven wheel is quickly decreased.

On the other hand, when step 430 determines that the flag FI is set, i.e., that step 410 has erroneously detected the slippage, step 450 quickly decreases the oil pressure to end the brake control. Step 460 determines whether an accumulated value $\Sigma TP$ of an oil pressure increasing time $\Sigma TDP$ is less than an accumulated value TP of an oil pressure decreasing time TDP multiplied by a correction factor Kp, i.e., whether the brake pressure is decreased to 0 by the brake control. If the answer is YES, step 470 resets the flag FB because the brake control has ended, and then the routine ends. If the answer in NO, the routine directly ends. The correction factor Kp is introduced because the change rate of the oil pressure differs whether the oil pressure is increased or decreased.

As described above, the brake control for the driven wheel starts when the driven-wheel speed VR exceeds the reference value VB. After that, the brake control is executed based on the driven-wheel speed VR and the driven-wheel acceleration $\dot{V}$ until the brake pressure is decreased to 0. If step 430 determines, after the starting of the brake control, that the flag F1 is set, the brake pressure quickly decreases at step 450 and the routine ends.

Figure 6:
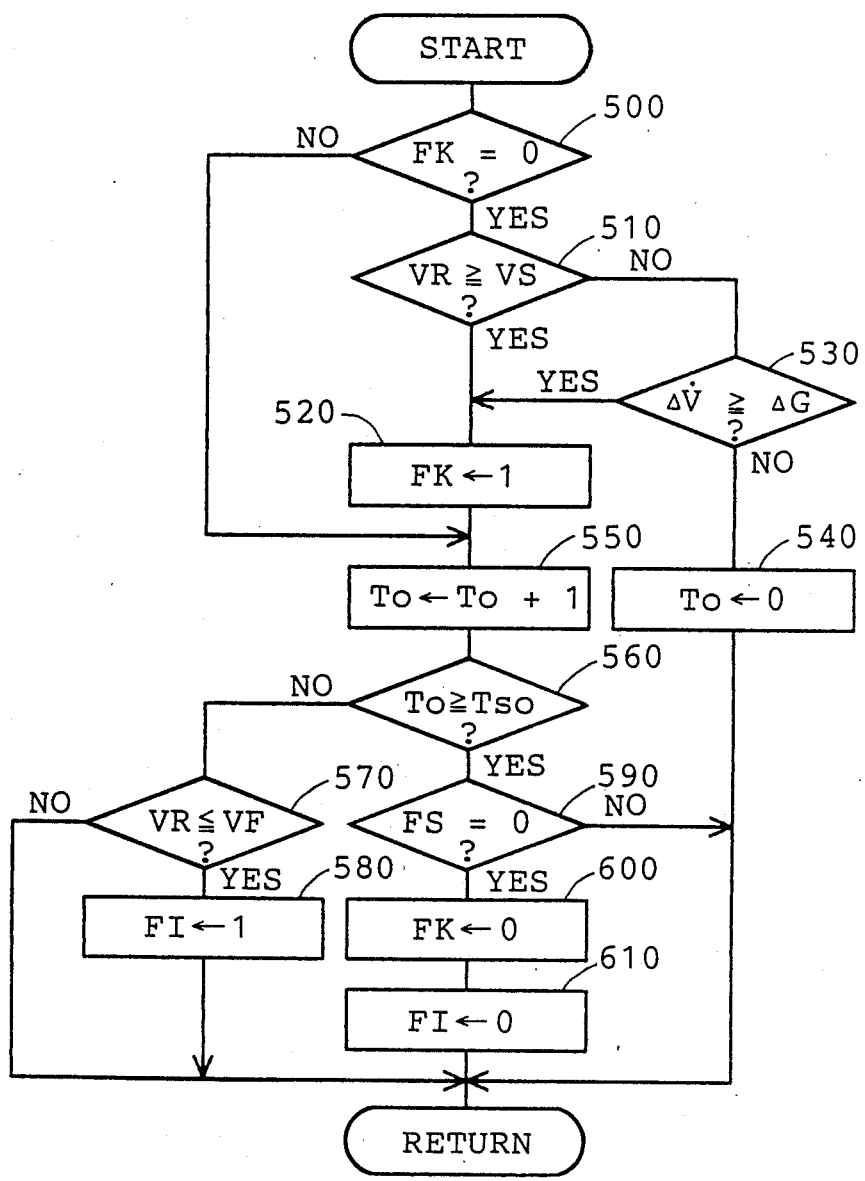
FIG. 6 is a flow chart for determining whether the slippage is instantaneous.

The instantaneous-slippage detection routine, which is repeatedly executed at preset intervals similarly with the aforementioned routines, is explained below with reference to the flow chart of FIG. 6. The routine determines whether the detected slippage of the driven wheel is instantaneous, i.e., whether it is caused by a rapid acceleration of the automobile, and sets or resets the flag FI accordingly. It corresponds to the instantaneous-slippage detector M5.

When the routine starts, step 500 determines whether a flag FK is reset to 0, i.e., whether no slippage at the driven wheel is detected. The flag FK is set when the acceleration slippage is detected at step 510 or 530 as described later. If FK=0, step 510 determines whether the driven-wheel speed VR exceeds the reference value VS (VR≧VS). If the answer is YES, the program proceeds to step 520. On the other hand, if the answer is NO (VR<VS), step 530 determines whether the change rate $\Delta \dot{V}$ of the driven-wheel acceleration $\dot{V}$ is greater than the reference change rate $\Delta G$. If the answer is NO ($\Delta \dot{V} < \Delta G$), step 540 resets a counter To. The counter To is for counting the time elapsed after the detection of the slippage. Then the routine ends. If the answer is YES ($\Delta \dot{V} \geq \Delta G$), the program proceeds to step 520 under the determination that the slippage has occurred at the driven wheel.

Step 520 sets the flag FK and step 550 increases the counter To by 1. This processing is also executed when step 500 determines that the flag FK is set. Step 560 determines whether the increased value of the counter To is greater than a first preset value Tso (To≧Tso), i.e., whether a preset time period (e.g., 200 msec) has elapsed after the detection of the slippage at step 510 or 530. If the answer is NO, step 570 determines whether the driven-wheel speed VR is below the body speed VF. If the answer is NO (VR>VF), the routine ends. If the answer is YES (VR≦VF), the program proceeds to step 580 assuming that the acceleration-slippage control is unnecessary because the detected acceleration slippage is instantaneous. Step 580 sets the flag FI, and then the routine ends.

When step 560 determines that the first preset time period has elapsed after the detection of the slippage, step 590 determines whether the flag FS is reset to 0, i.e., whether neither of the sub-throttle valve control and the brake control are executed. If the answer is YES, steps 600 and 610 reset the flags FK and FI, respectively, and then the routine ends. If the answer is NO, the routine immediately ends. In other words, in the instantaneous-slippage detection routine, the slippage of the driven wheel is detected based on the driven-wheel speed VR and the driven-wheel acceleration $\dot{V}$. If the slippage is detected, it is determined that the detected slippage is instantaneous if it subsides within the first preset time, (e.g., 200 msec). If the slippage is instantaneous, the flag FI is set, and the sub-throttle valve control and the brake control are interrupted.

Figure 7:
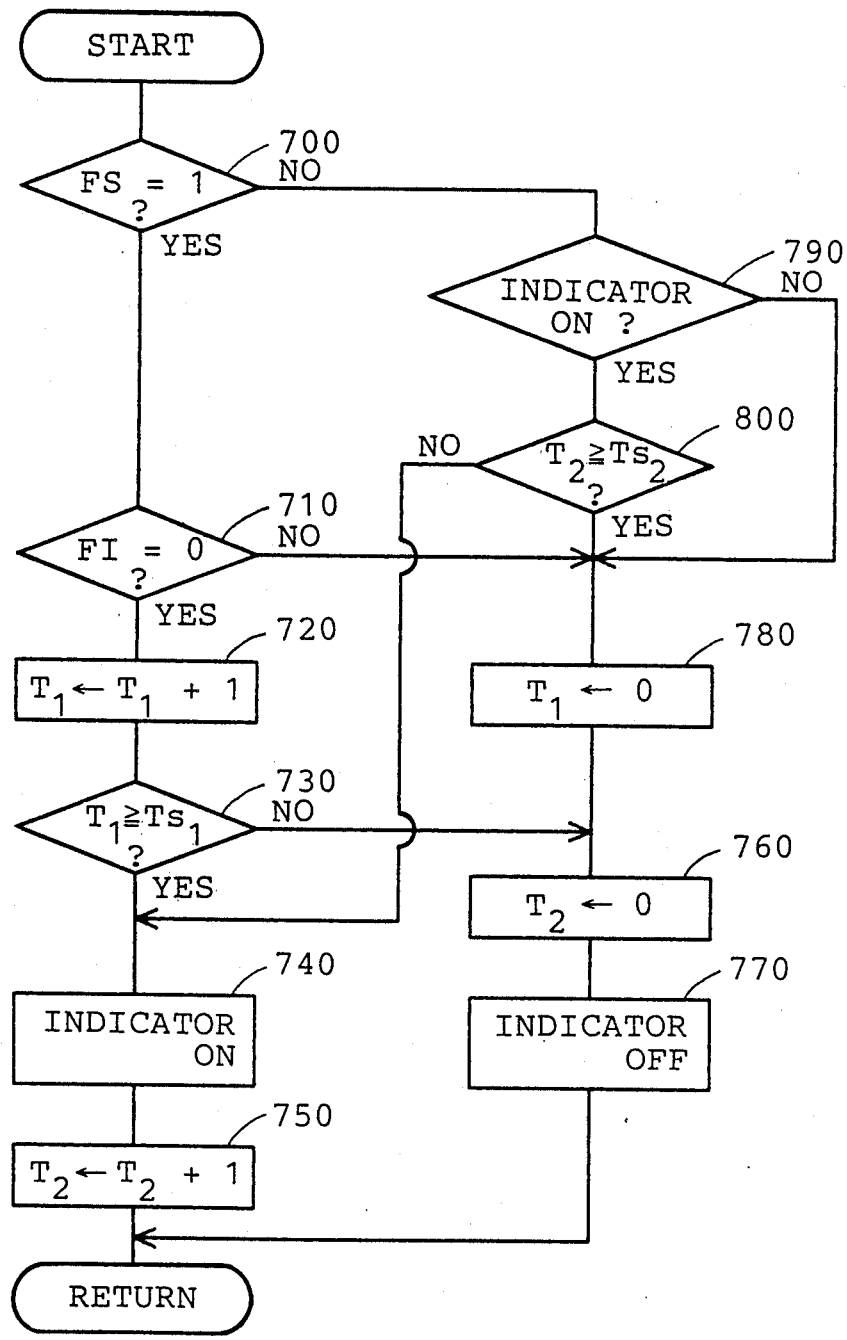
FIG. 7 is a flow chart for switching on/off the indicator.

The indicator warning routine, which is repeatedly executed at preset intervals similarly with the aforementioned routines, is explained below with reference to the flow chart of FIG. 7. The routine switches the indicator 58 on to inform the driver of the execution of the acceleration-slippage control, i.e., the sub-throttle valve control or the brake control.

When the routine starts, step 700 determines whether the flag FS is set, i.e., whether the acceleration-slippage control is executed. If the answer is YES (FS=1), step 710 determines whether the flag FI is reset. If the answer is YES (FI=0), i.e., the acceleration-slippage control is being currently executed, step 720 increases a counter T1 by 1 to count the time elapsed after the starting of the acceleration-slippage control. The counter T1 is reset when no acceleration-slippage control is executed.

Step 730 determines whether the increased value of the counter T1 is greater than a preset value Ts1, i.e., whether a third preset time, (e.g., 500 msec) has elapsed after the starting of the acceleration-slippage control. If T1≧Ts1, step 740 switches the indicator 58 on, and step 750 increases a counter T2 by 1 to count the time elapsed after the processing at step 740. Then the routine ends.

On the other hand, when step 730 determines that T1<Ts1, step 770 resets T2, and step 770 switches the indicator 58 off. Then the routine ends. Alternatively, when step 710 determines that the flag FI is set, step 780 resets the counter T1. Step 760 resets the counter T2 and step 770 switches the indicator 58 off. Then the routine ends.

When step 700 determines that the flag FS is reset, i.e., that no acceleration-slippage control is executed, step 790 determines whether the indicator 58 is on. If the answer is YES, step 800 determines whether the value of the counter T2 is greater than a preset value Ts2, i.e., whether the third indicator 58 has been on for a fourth preset time, (e.g., 3 sec). If the answer is NO (T2<Ts2), the program proceeds to step 740, where the indicator 58 remains on, and step 750 increases the counter T2 by 1. Then the routine ends. When step 800 determines that T2≧Ts2, steps 780 and 760 reset the counters T1 and T2, respectively, and step 770 switches the indicator 58 off. Then the routine ends.

In summary, in this routine, if the acceleration-slippage control is continuously executed over the preset time, (500 msec), the indicator 58 is switched on to inform the driver of the execution of the acceleration-slippage control. When the acceleration-slippage control ends, the indicator 58 is switched off after the fourth preset time, (3 sec).

As shown in FIGS. 9A through 9E, in the acceleration-slippage controller of this embodiment, when the driver presses an accelerator pedal 50 to quickly open, the main-throttle valve 51 opens between time points t0 and t1. When the driven-wheel speed VR exceeds the reference speed VS determined based on the body speed VF at time point t3, the sub-throttle valve control starts. Further, when the driven-wheel speed VR exceeds the higher reference value VB at time point t4, the brake control starts. The driven-wheel speed VR quickly decreases below the reference value VB due to the brake control. When the brake pressure decreases to 0 at time point t6, the brake control ends. After that, the slippage is still controlled by the sub-throttle valve control until the sub-throttle valve opening θS becomes equal to or greater than the main-throttle valve opening θM.

When the conditions for the sub-throttle valve control or for the brake control exist, they are continuously executed until the sub-throttle valve opening θS exceeds the main-throttle valve opening θM, or until the brake pressure decreases to 0. In the prior-art controllers, as shown in FIG. 10B, when the driven-wheel speed VR instantaneously exceeds the reference speed VS during the acceleration, the conditions for the sub-throttle valve control are determined to be satisfied. As shown by the broken line of FIG. 10C, the sub-throttle valve control is executed for a long time until the sub-throttle valve opening θS becomes equal to or greater than the main-throttle valve θM.

Figure 10A:
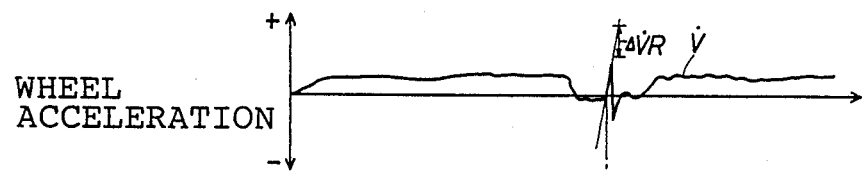
FIGS. 10A, 10B and 10C are timing charts comparing the difference between the embodiment and the prior art in the acceleration-slippage control for instantaneous slippage.
Figure 10B:
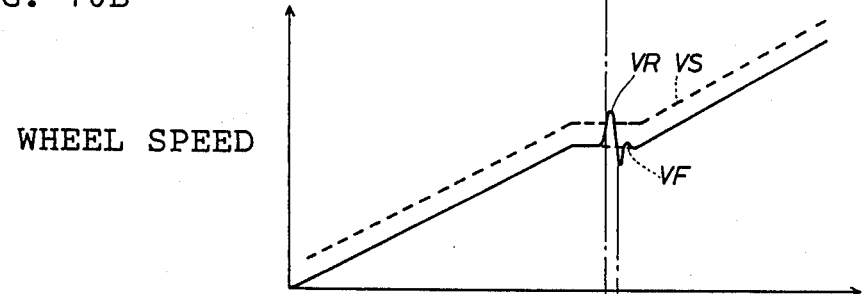

On the other hand, as shown in FIGS. 10A and 10B, the instantaneous-slippage detection routine of this embodiment detects the slippage based on the change rate $\Delta \dot{V}$ of the driven-wheel acceleration $\dot{V}$ or based on the driven-wheel speed VR, and if the driven-wheel speed VR decreases below the first body speed VF within the preset time, (200 msec), it is determined that the detected slippage is so instantaneous that the control is unnecessary. Thus, the flag FI is set, and both the sub-throttle valve control and the brake control are interrupted.

Figure 10C:
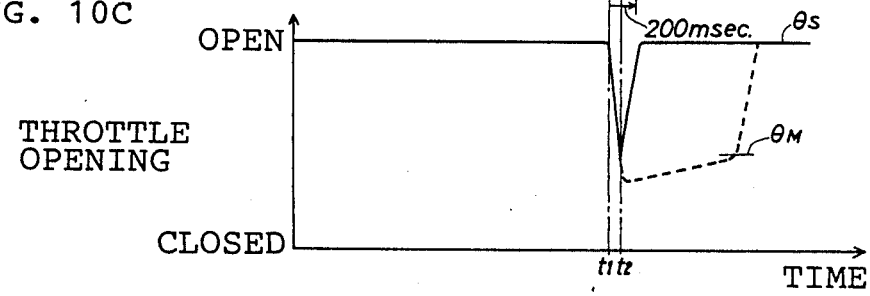

As shown in FIG. 10C, after the starting of the sub-throttle valve control due to the instantaneous slippage, if the instantaneous-slippage detection routine determines that the control is unnecessary, the sub-throttle valve 54 quickly opens to rapidly end the acceleration-slippage control.

Therefore, even if the automobile quickly accelerates for passing another, the instantaneous-slippage detection routine avoids the long acceleration-slippage control. Thus, the acceleration of the automobile improves. Moreover, the routine prevents the acceleration-slippage control from being executed by the slippage detected due to the assembly play in the driven system. Therefore, no special measures are needed in the revolution speed sensor and others to improve the accuracy in detecting the slippage.

Figure 9A:
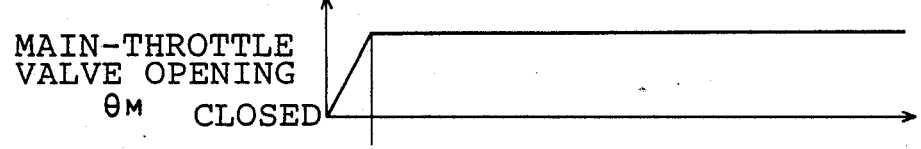
FIGS. 9A, 9B, 9C, 9C and 9E are timing charts respectively showing the main-throttle valve opening $\theta M$ (FIG. 9A), the sub-throttle valve opening $\theta S$ (FIG. 9B), the brake pressure PB (FIG. 9C), the indicator (FIG. 9D) and the driven-wheel speed VR (FIG. 9E) in the acceleration-slippage control.
Figure 9B:
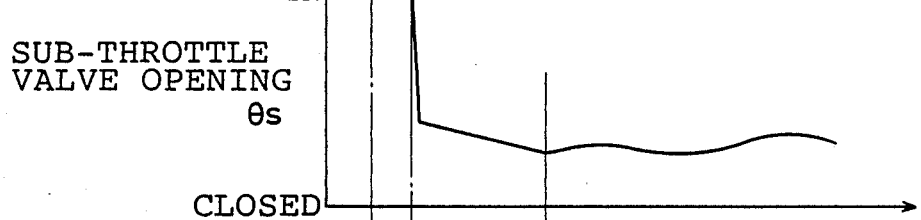
Figure 9C:
Figure 9D:
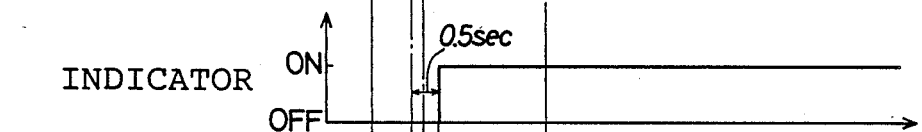
Figure 9E:
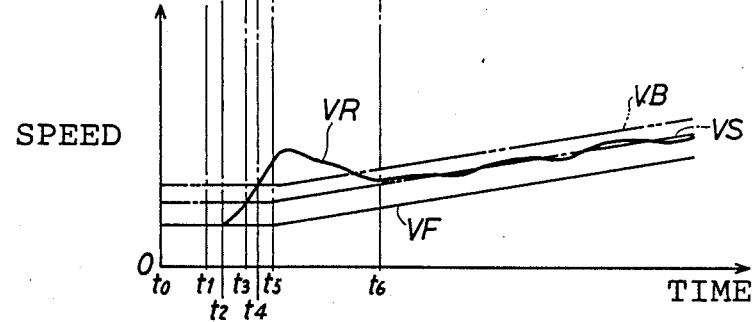

As shown in FIGS. 9D, the indicator warning routine of this embodiment switches on the indicator 58 after the preset third time, (500 msec) has elapsed since the starting of the acceleration-slippage control. Therefore, when the acceleration-slippage control quickly subsides the slippage, the indicator 58 is not switched on to refrain from frequent lighting. Thus, the indicator 58 does not disturb the driving of the automobile. Only when the driver's attention is needed in the accelerating operation, i.e., when the road is slippery, or when the driver presses the accelerator pedal 50 too deep, the indicator 58 is switched on.

In this embodiment, the instantaneous-slippage detection routine detects the slippage of the driven wheel based on the driven-wheel speed VR and the change rate $\Delta \dot{V}$ of the driven-wheel acceleration $\dot{V}$. Alternatively, the slippage may be detected based on whether the driven-wheel acceleration $\dot{V}$ exceeds a preset value G. Further, since the slippage is determined by the flag FS, it can be used for determining an instantaneous slippage. That is, when the driven-wheel speed falls below the body speed within the preset time after FS is set, it is determined to be instantaneous.

This embodiment of the present device is just one example of the claimed invention. The claims are not restricted to this example. This invention embraces all variations and modifications within the scope of the claims.

What is claimed is:

1. A control system for controlling acceleration slippage on a driven wheel of an automobile comprising:
    a driven-wheel speed sensor for sensing a speed of the driven wheel;
    a body speed sensor for sensing a body speed of the automobile;
    a slippage detection means for detecting an occurrence of acceleration slippage of the driven wheel using the driven-wheel speed and the body speed and making a slippage-start judgment when the occurrence of acceleration slippage of the driven wheel is detected;
    a slippage controller for starting an acceleration-slippage control according to a starting condition that is based on the slippage-start judgment and for terminating the acceleration-slippage control according to a normal terminating condition that is not directly connected to the occurrence of acceleration-slippage;
    an instantaneous-slippage detector for determining whether the detected slippage is instantaneous; and
    an interrupting means for terminating the acceleration-slippage control when the detected slippage is determined to be instantaneous.

2. The acceleration-slippage control system, as in claim 1, where the instantaneous-slippage detector determines that the detected slippage is instantaneous when the speed of the driven wheel falls to less than the body speed within a first preset short time period after the slippage-start judgment is made, the slippage-start judgment being different from the starting condition for the acceleration-slippage control.

3. The acceleration-slippage control system, as in claim 2, where the starting condition is that a second preset short time period elapses after the slippage-start judgment is made during which the slippage detection means continues to detect the occurrence of acceleration slippage and a main-throttle valve of an internal combustion engine of the automobile is not shut, the second preset short time period being shorter than the first preset short time period.

4. The acceleration-slippage control system, as in claim 3, where:
    the slippage controller adjusts an opening of a sub-throttle valve of the internal combustion engine for controlling the acceleration slippage; and
    the normal terminating condition is that the opening of the sub-throttle valve is greater than the opening of the main-throttle valve.

5. The acceleration-slippage control system, as in claim 4, where the slippage controller further adjusts a hydraulic pressure of the brake system of the driven wheel for controlling the acceleration slippage.

6. The acceleration-slippage control system, as in claim 5, where the system further comprises warning means for informing the driver of the automobile of the acceleration-slippage control when the acceleration-slippage control is under way a third preset time period after the slippage-start judgment is made, the third preset time period being longer than the first preset time period.

7. The acceleration-slippage control system, as in claim 6, where the body speed sensor senses a speed of a non-driven wheel of the automobile.

8. The acceleration-slippage control system, as in claim 3, where the system further comprises:
    a driven-wheel acceleration calculation means for calculating an acceleration of the driven wheel; and
    a reference speed calculation means for calculating a reference speed from body speed; where
    slippage detection means detects an occurrence of acceleration slippage when the speed of the driven wheel is greater than the reference speed or the acceleration of the driven wheel exceeds a preset reference value.

* * * * *